United States Patent [19]

Ueda et al.

[11] Patent Number: 5,006,491

[45] Date of Patent: Apr. 9, 1991

[54] PROCESS FOR PRODUCTION OF NITRIDE CERAMIC SHAPES

[75] Inventors: Syuusaku Ueda, Harunamachi; Masayuki Fujimoto, Takasaki, both of Japan

[73] Assignee: Taiyo Yuden CO., Ltd., Tokyo, Japan

[21] Appl. No.: 326,365

[22] Filed: Mar. 21, 1989

[30] Foreign Application Priority Data

Mar. 31, 1988 [JP] Japan .................................. 63-80174

[51] Int. Cl.$^5$ .............................................. C04B 35/58
[52] U.S. Cl. ........................................ 501/96; 501/97; 501/98
[58] Field of Search ............... 501/96, 97, 98; 264/65, 264/66

[56] References Cited

U.S. PATENT DOCUMENTS

| | | | |
|---|---|---|---|
| 3,591,668 | 7/1971 | Kichner et al. | 264/66 |
| 3,786,124 | 1/1974 | Platts | 264/66 |
| 4,435,513 | 4/1984 | Komaya et al. | 501/96 |
| 4,698,320 | 10/1987 | Kasori et al. | 501/96 |
| 4,711,861 | 12/1987 | Sawamura et al. | 501/96 |
| 4,719,187 | 1/1988 | Bardhan et al. | 501/97 |
| 4,746,637 | 5/1988 | Kasori et al. | 501/96 |
| 4,753,763 | 6/1988 | Tanaka et al. | 264/65 |
| 4,810,479 | 3/1989 | Biardeau et al. | 501/96 |
| 4,810,679 | 3/1989 | Dole et al. | 501/96 |
| 4,857,140 | 8/1989 | Loewenstein | 156/643 |
| 4,877,482 | 10/1989 | Knapp et al. | 156/646 |

FOREIGN PATENT DOCUMENTS 0166073 1/1986 European Pat. Off. ............... 501/96

*Primary Examiner*—William R. Dixon, Jr.
*Assistant Examiner*—Sue Hollenbeck
*Attorney, Agent, or Firm*—Woodcock Washburn Kurtz Mackiewicz & Norris

[57] ABSTRACT

There is first prepared a mixture of a nitride ceramic material (e.g. aluminum nitride) and a sintering aid (e.g. calcium carbonate), both in finely divided form. Admixed with a binder, the mixture is pressed into moldings of desired shape. The moldings are sintered to maturity in a nitrogenous atmosphere. The sintered moldings are subsequently aftertreated by being exposed to fluorine or its compound at a reduced temperature in the range of, typically, 1000° to 1600° C. The aftertreatment eliminates undesired intergranular substances from the sintered moldings and thus improves their thermal conductivity.

9 Claims, No Drawings

PROCESS FOR PRODUCTION OF NITRIDE CERAMIC SHAPES

BACKGROUND OF THE INVENTION

Our invention relates to a process for the fabrication of ceramic products, particularly of those of improved thermal conductivity composed principally of a nitride such as aluminum nitride (AlN). The process of our invention is well suited for the production of ceramic packages for circuit boards and integrated circuits although we do not wish our invention to be limited to this particular application.

It is a common knowledge among the ceramics specialists that some nitrides such as AlN are sinterable to maturity by hot pressing. The hot pressing is a process wherein pressure and heat are applied simultaneously at temperatures high enough for sintering to occur. This process has some drawbacks, however. One of these is the lack of adaptability for quantity production. Another is the difficulties involved in the fabrication of large size products.

These drawbacks of the hot pressing method are overcome by another known process that calls for the use of sintering aids such as calcium carbonate, $CaCO_3$, aluminum oxide (alumina), $Al_2O_3$, and yttrium oxide (yttria), $Y_2O_3$. Any selected sintering aid is admixed with a desired nitride material in finely divided form. The admixture is molded into desired shape, and the moldings are sintered under atmospheric pressure. Liquefied at elevated temperatures, the sintering aid fills the interstices of the moldings and so aids in the sintering of the nitride material. The sintering aid serves the additional purpose of entrapping oxygen existing as an impurity substance in the nitride material.

The conventional method of making nitride ceramic shapes with use of sintering aids has its own weakness, however. The nitride material and the sintering aid in use reacts upon firing of the moldings and creates a substance that remains among the ceramic grains produced by sintering. It has been known that that intergranular substance reduces the thermal conductivity of the resulting ceramic products. The elimination of this undesired substance is essential for higher thermal conductivities of nitride ceramic products.

SUMMARY OF THE INVENTION

We have hereby invented how to improve the thermal conductivities of nitride ceramic products through reduction of the amount of the undesired intergranular substance contained therein.

Briefly, our invention may be summarized as a process for the fabrication of nitride ceramic products, which comprises preparing a mixture nitride ceramic material such as AlN and a sintering aid such as $CaCO_3$, both in finely divided form. The mixture is formed into moldings of desired shape. The moldings are sintered to maturity in a nitrogenous atmosphere. Then, for aftertreatment, the sintered moldings are exposed to an atmosphere composed principally of fluorine or its compound, at an elevated temperature which may be lower than the sintering temperature.

The following is our explanation of how the process of our invention improves the thermal conductivities of nitride ceramics. In the production of nitride ceramic shapes from AlN, for example, with use of $CaCO_3$ as a sintering aid, the sintering of the mixture of these substances in a nitrogeous atmosphere creates $CaO.2(Al_2O_3)$ as the undesirable intergranular substance. This intergranular substance is removed as the Ca included therein reacts with the fluorine and/or fluoride during the aftertreatment. Experiment has also proved that the aftertreatment remarkably reduces the oxygen concentrations of the sintered moldings. Hence the higher thermal conductivities of the nitride ceramics produced by the process of our invention.

A preferred substance for creating the atmosphere of the aftertreatment in accordance with our invention is tetrafluoromethane. On being heated, this substance decomposes into fluorine atoms and a radical expressed as $CF_x$ where x is a numeral not more than four. The decomposition products react with the intergranular substance to generate $CO$, $CO_2$, $COF_2$ and $CaF_2$. We believe that these compounds leave the sintered moldings by diffusion.

The above and other features and advantages of our invention and the manner of realizing them will become more apparent, and the invention itself will best be understood, from a study of the following description and appended claims.

DETAILED DESCRIPTION OF THE INVENTION

We made 20 different sets of AlN ceramic test discs, some in accordance with our invention and others not, and measured their calcium concentrations, oxygen concentrations, and thermal conductivities. The results were as in the following Table.

| Aftertreatment Conditions and Ceramic Properties | | | | | |
|---|---|---|---|---|---|
| Test No. | Aftertreatment Conditions | | | Ceramic Properties | | |
| | Atmosphere | Temperature, °C | Time, h | Ca Concentration, ppm | Oxygen Concentration, ppm | Thermal Conductivity, W/m.K. |
| 1 | $CF_4$ | 1600 | 2.00 | 460 | 310 | 267 |
| 2 | " | " | 0.25 | 980 | 1000 | 233 |
| 3 | " | " | 10.00 | 110 | 230 | 205 |
| 4 | " | 1000 | 2.00 | 420 | 960 | 239 |
| 5 | " | " | 0.25 | 740 | 1500 | 212 |
| 6 | " | " | 10.00 | 150 | 890 | 204 |
| 7 | " | 1600 | 0.15 | 1600 | 2000 | 190 |
| 8 | " | " | 15.00 | 100 | 130 | 161 |
| 9 | " | 2000 | 2.00 | 180 | 250 | 195 |
| 10 | " | 900 | " | 390 | 610 | 184 |
| 11 | — | — | — | 2200 | 2500 | 166 |
| 12 | $N_2$ | 1600 | 2.00 | 1400 | 1900 | 193 |
| 13 | " | " | 0.25 | 2100 | 2400 | 162 |
| 14 | " | " | 10.00 | 1200 | 1600 | 159 |
| 15 | $CF_4$ | " | 2.00 | 510 | 490 | 259 |
| 16 | " | " | 0.25 | 1200 | 1400 | 230 |

-continued

Aftertreatment Conditions and Ceramic Properties

| Test No. | Aftertreatment Conditions | | | Ceramic Properties | | |
|---|---|---|---|---|---|---|
| | Atmosphere | Temperature, °C. | Time, h | Ca Concentration, ppm | Oxygen Concentration, ppm | Thermal Conductivity, W/m.K. |
| 17 | " | " | 10.00 | 150 | 280 | 205 |
| 18 | " | 1000 | 2.00 | 440 | 1100 | 238 |
| 19 | " | " | 0.25 | 830 | 1800 | 207 |
| 20 | " | " | 10.00 | 230 | 940 | 202 |

First, for the fabrication of the ceramic test pieces of Test No. 1, we added as a sintering aid one part by weight of $CaCO_3$, in terms of CaO, to 100 parts by weight of AlN in finely divided form. The AlN had an average particle size of 0.6 micrometers meters ($\mu m$) and had been found to contain 0.89% by weight of oxygen by an oxygen concentration analyzer. We intimately intermingled the two substances in ethanol.

After drying the mixture we added seven parts by weight of stearic acid, a binder, to 100 parts by weight of the dry mixture. Then we molded the mixture into discs under a pressure of five tons per square centimeter. Each disc measured 15 millimeters in diameter and three millimeters in thickness.

We enclosed the discs in a graphite crucible and placed it in a graphite furnace of cylindrical shape. Then we heated the discs to a temperature of 500° C. by a graphite made heater, thereby driving off the binder. Then, with the discs held in an atmosphere of 99.999% pure nitrogen and under atmospheric pressure, we further heated them to a sintering temperature of 1800° C. at a rate of 7.5° C. per minute and held them at that temperature for three hours. Then we lowered the furnace temperature to 1600° C.

At that furnace temperature we aftertreated the sintered discs by introducing a gas of predominantly (99.99%) tetrafluoromethane, $CF_4$, into the furnace at a rate of one liter per minute. We continued the introduction of the $CF_4$ gas for two hours at the same furnace temperature of 1600° C. for the elimination of undesired intergranular matter from the sintered discs. Then we allowed the furnace temperature to drop to room temperature, thereby completing the fabrication of the ceramic test discs. We believe that the $CF_4$ gas decomposed into F and $CF_x$ on being heated within the furnace.

We proceeded to measure the three physical properties in question of the thus fabricated ceramic test discs of Test No. 1. Their thermal conductivities, measured by the laser flash method after vapor deposition of gold and carbon thereon, averaged 267 W/m.K. The concentrations of calcium, the undesired intergranular substance, in the test discs, averaged 460 parts per million (ppm) as measured by inductively coupled plasma emission spectrometry. The oxygen concentrations of the test discs averaged 310 ppm as measured by an oxygen in metal analyzer.

Thus, in the Table, the columns labeled "Atmosphere", "Temperature" and "Time" represent the atmosphere, temperature, and length of time, respectively of the aftertreatment conducted in each Test for the removal of the undesired intergranular substance. The other three columns represent the three physical properties of the resulting test pieces as measured by the above specified methods.

We produced the ceramic discs of Tests Nos. 2-10 by the same method as with Test No. 1 except for the specified changes in the temperature and time of the aftertreatment. The average the conductivities and the Ca and oxygen concentrations of these ceramic discs were as in the Table.

By way of comparision we made the ceramic discs of Test No. 11 by omitting the aftertreatment, the method of production having been identical in other respects with that of Test No. 1. Also, in Tests Nos. 12-14, we aftertreated the sintered test pieces in an atmosphere of a predominantly nitrogen ($N_2$) gas, in lieu of the $CF_4$ gas, and at a temperature of 1600° C. for 2.00, 0.25 and 10.00 hours, respectively. The other details in the method of fabrication were as set forth in connection with Test No. 1.

For the fabrication of the ceramic discs of Test No. 15 we made moldings from the same materials as in Test No. 1 and sintered them under the same conditions as in Test No. 1. Unlike Test No. 1, however, we allowed the sintered moldings to cool temporarily to room temperature. Then, for the aftertreatment proposed by the invention, we reheated the sintered discs to 1600° C. and held them at that temperature for two hours with the constant introduction of $CF_4$ gas into the furnace at a rate of one liter per minute. Then we allowed the discs to cool to room temperature.

We produced the ceramic discs of Tests Nos. 16 and 17 by the same method as in Test No. 15 except for aftertreating the sintered AlN discs by holding them 0.25 and 10.00 hours, respectively, at the furnace temperature of 1600° C. with the constant introduction of the $CF_4$ gas at the rate of one liter per minute. Test No. 18 differed from Test No. 15 only in that the temperature of the aftertreatment was 1000° C. Tests Nos. 19 and 20 differed from Test No. 18 only in that the length of time of the aftertreatment was changed to 0.25 and 10.00 hours, respectively.

In order to appreciate the advantages arising from the aftertreatment of the sintered discs with the $CF_4$ gas in accordance with our invention, a comparision may be made between Tests Nos. 1-10 and Tests Nos. 11-14. Generally, the Ca and oxygen concentrations of the $CF_4$ aftertreated test pieces are lower. We attribute these results to the elimination of the intergranular matter by F and $CF_x$, the thermal decomposition products of $CF_4$ Tests Nos. 11-14 are therefore outside the scope of our invention.

An inspection of Tests Nos. 1, 3, 4 and 6 will reveal that the Ca and oxygen concentrations are particularly low, and the thermal conductivity high, when the aftertreatment is effected in a temperature range of 1000° to 1600° C. and in a time range of two to 10 hours. The higher thermal conductivities attained in these Tests are obviously because the evaporation of the AlN particles is reduced to a minimum during the aftertreatment in the noted temperature and time ranges. -Tests Nos. 15-20 prove, however, that the sintered moldings need not be aftertreated before cooling to room temperature.

The sintered moldings were allowed to cool to room temperature and then reheated for the CF$_4$ aftertreatment in all these Tests. The Ca and oxygen concentrations and thermal conductivity of the resulting ceramic discs were nevertheless satisfactory.

The Ca and oxygen concentrations are rather high, and the thermal conductivity rather low, when the length of time of the aftertreatment is as short as 0.15 hours as in Test No. 7, and when the temperature of the aftertreatment is as low as 900° C. as in Test No. 10. Also, the thermal conductivity becomes rather low when the aftertreatment time is as long as 15 hours as in Test No. 8, and when the aftertreatment temperature is as high as 2000° C. as in Test No. 9. We suppose that the results of Tests No. 8 and 9 were brought about by excessive evaporation of the AlN particles along with the intergranular matter, with the consequent creation of large interstices within the sintered bodies.

Accordingly, the preferred range of temperatures of the aftertreatment according to our invention is from 1000° to 1600° C. The preferred length of time of the aftertreatment is from two to 10 hours.

We recommend CF$_4$ as a substance for creating the require atmosphere in which the sintered moldings may be aftertreated for the removal of the undesired substances. CF$_4$ is stable at room temperature and, on being heated, decomposes to provide gaseous fluorine. Experiment has proved, however, that other gaseous fluorides are employable, either singly or in combination of two or more. Examples are CCl$_3$F, CC$_2$F$_2$, CBrClF$_2$, CClF$_3$, CBrF$_3$, CHClF$_2$, CHF$_3$, CC$_2$F—CCl$_2$F, CCl$_2$F—CClF$_2$, CClF$_2$—CClF$_2$, —CBrF$_2$-CBrF$_2$, CClF$_2$—CF$_3$, CF$_3$—CF$_3$, CH3—CClF$_2$, CH3—CHF$_2$, azeotrope of CCl$_2$F$_2$ and C$_2$H$_4$F$_2$, azeotrope of CHClF$_2$ and C$_2$ClF$_3$, azeotrope of CClF$_3$ and CHF$_3$, and CF$_2$—CF$_2$CF$_2$—CF$_2$.

Additional variations in the details of the foregoing disclosure may be readily contemplated by those skilled in the ceramics art without departing from the scope of our invention. For example, our invention permits the use of sintering aids other than that employed in the above disclosed Tests. Such alternative sintering aids may be selected from alkaline earth metals and their compounds, rare earth elements and their compounds, etc. It will also be apparent that the temperature and time of the aftertreatment for the removal of undesirable matter from the sintered moldings are subject to change depending upon the composition of the nitride ceramic material, the sintering aid in use, and the substance employed for the creation of the atmosphere of the aftertreatment.

What we claim is:

1. A process for the fabrication of nitride ceramic products which comprises:
   (a) preparing a mixture of a nitride material and a sintering aid, both in finely divided form;
   (b) forming the mixture into moldings of desired shape;
   (c) sintering the moldings to maturity in a nitrogenous atmosphere, the sintered moldings having undesirable intergranular substances; and
   (d) aftertreating the sintered moldings by exposing the sintered moldings to an atmosphere containing at least either of fluorine and a fluoride at an elevated temperature so as to remove the undesirable intergranular substances.

2. The process of claim 1 wherein the moldings are sintered to maturity at a first temperature, and wherein the sintered moldings are aftertreated at a second temperature that is lower than the first temperature.

3. The process of claim 2 wherein the sintered moldings are aftertreated on being allowed to cool from the first to the second temperature.

4. The process of claim 2 wherein the sintered moldings are allowed to cool from the first temperature to room temperature and then reheated to the second temperature for the aftertreatment.

5. The process of claim 1 wherein the nitride material is aluminum nitride.

6. The process of claim 1 wherein the sintering aid is selected from the group consisting of calcium carbonate, aluminum oxide, and yttrium oxide.

7. The process of claim 1 wherein the sintered moldings are aftertreated in a temperature range of 900° to 2000° C.

8. The process of claim 1 wherein the sintered moldings are aftertreated in a temperature range of 1000° to 1600° C.

9. A process for the fabrication of nitride ceramic products which comprises:
   (a) preparing a mixture of a nitride material and a sintering aid in finely divided form;
   (b) molding the mixture into desired shape;
   (c) placing the molding of the mixture within a furnace;
   (d) sintering the moldings to maturity by heating the sintered molding to a first temperature within the furnace filled with nitrogenous gas, the sintered moldings having undesirable intergranular substances;
   (e) changing the furnace temperature to a second temperature that is lower than the first temperature; and
   (f) aftertreating the sintered moldings by introducing a gaseous tetrafluoromethane into the furnace at the second temperature so as to remove the undesirable intergranular substances.

* * * * *